United States Patent [19]

Filas et al.

[11] Patent Number: 5,480,046
[45] Date of Patent: Jan. 2, 1996

[54] FIBER PROBE FABRICATION HAVING A TIP WITH CONCAVE SIDEWALLS

[75] Inventors: Robert W. Filas, Bridgewater; Herschel M. Marchman, New Providence, both of N.J.

[73] Assignee: AT&T Corp., Murray Hill, N.J.

[21] Appl. No.: 247,164

[22] Filed: May 20, 1994

Related U.S. Application Data

[63] Continuation-in-part of Ser. No. 173,384, Dec. 22, 1993, abandoned.

[51] Int. Cl.$^6$ .............................. B44C 1/22; C03C 15/00
[52] U.S. Cl. ................................. 216/7; 216/49; 216/91; 216/97
[58] Field of Search ....................... 156/639, 651, 156/654, 659.1, 662, 663, 639.1, 651.1, 654.1, 659.11, 662.1; 65/31; 250/458.1; 252/79.3; 216/7, 8, 41, 49, 91, 97, 99; 385/123

[56] References Cited

U.S. PATENT DOCUMENTS

| | | | |
|---|---|---|---|
| 4,604,520 | 8/1986 | Pohl | 250/216 |
| 5,018,865 | 5/1991 | Ferrell et al. | 356/376 |
| 5,272,330 | 12/1993 | Betzig et al. | 250/216 |
| 5,290,398 | 3/1994 | Feldman et al. | 156/651 |

OTHER PUBLICATIONS

Wickramasinghe, H. K., "Scanned–Probe Microscopes," *Scientific American*, vol. 261, No. 4, pp. 98–105 (Oct. 1989).
Binnig, G. et al., "Atomic Force Microscope," *Phys. Rev. Lett.*, vol. 56, No. 9, Mar. 3, 1986, pp. 930–933.
Pangaribuan, T. et al., "Reproducible Fabrication Technique of Nanometric Tip Diameter Fiber Probe For Photon Scanning Tunneling Microscope," *Japan Journal Applied Physics*, vol. 31 (1992), pp. L 1302–L 1304, Part 2, No. 9A, 1 Sep. 1992.
Cassidy, R., "R & D Microscopy—Pick the Right Probe For Your SPM Needs," *R & D Magazine*, Sep. 1993, pp. 57–58.

*Primary Examiner*—William Powell
*Attorney, Agent, or Firm*—David I. Caplan

[57] ABSTRACT

A probe device is fabricated from a glass fiber segment by first isotropically etching only a portion of the diameter of only a bottom region thereof. Next, the bottom region is cleaved, to produce a cleaved bottom endface. Then the cleaved endface and a height of the sidewalls of the bottom region that is less than its total height are coated with a protective masking layer. The fiber segment is immersed in an isotropic etching solution, whereby its diameter is reduced. Finally, the masking layer is stripped off, and the bottom region is etched again until the (maximum) diameter of the cleaved endface is reduced to a desired value.

24 Claims, 3 Drawing Sheets

FIBER PROBE FABRICATION HAVING A TIP WITH CONCAVE SIDEWALLS

CROSS-REFERENCE TO RELATED APPLICATIONS

This application is a continuation-in-part of Marchman 5, application Ser. No. 08/173,384 filed Dec. 22, 1993, now abandoned, which is incorporated herein by reference.

TECHNICAL FIELD

This invention relates to probe devices, and more particularly to metrological fiber probe devices and to methods of making them.

BACKGROUND OF THE INVENTION

More than 100 years ago, the famous physicist Ernst Abbe described a fundamental limitation of any microscope that relies on any lens or system of lenses in an imaging system to focus light or other radiation: diffraction obscures (makes fuzzy) those details of the image that are smaller in size than approximately one-half the wavelength of the radiation. See "Scanned-Probe Microscopes" by H. Kumar Wickramasinghe, published in *Scientific American*, Vol. 261, No. 4, pp. 98–105 (October 1989). In other words, the resolution of the microscope is limited by the wavelength of the radiation. In order to circumvent this limitation, researchers have investigated the use of, inter alia, various types or imaging probes. Scanning tunneling microscopy (hereinafter "STM") devices, atomic force microscopy (hereinafter "AFM") devices, and near-field scanning optical microscopy (hereinafter "NSOM") are some examples of different types of probe microscopes.

In STM, a metallic probe is brought sufficiently close to a conducting sample surface such that a small tunneling current is established. The magnitude of this current is extremely dependent on the tip-to-sample distance (i.e., topography of the sample surface). The tip is allowed to scan laterally across the (irregular) surface of the sample body with several angstroms separation between tip and sample in order to achieve imaging with atomic-scale resolution. The tunneling current, and hence the tip-to-sample separation, is detected and controlled by an electromechanical feedback servomechanism. In AFM, imaging is achieved in a similar manner to that of the STM except that the atomic forces (either short-range repulsive or long-range attractive) are detected instead of tunneling current. An obvious advantage to this technique is that the tip and sample do not have to be conductive (all materials exert atomic forces).

An NSOM device is typically comprised of an aperture located at the tip of an elongated optical probe, the aperture having a (largest) dimension that is smaller than approximately the wavelength of the optical radiation that is being used. During device operation, the probe is positioned in close proximity to the surface of a sample body. The aperture of the probe is then allowed to scan across the surface of the sample body at distances of separation therefrom all of which distances are characterized by mutually equal force components exerted on the probe device in the direction perpendicular to the global (overall) surface of the sample body, the scanning being detected and controlled by an electromechanical feedback servomechanism as was the case in STM and AFM.

For example, U.S. Pat. No. 4,604,520, describes, inter alia, a probe device having an aperture located at the tip of a cladded glass fiber that has been coated with a metallic layer. The aperture is drilled into the metallic layer at the tip of the fiber at a location that is coaxed with the fiber. The (immediate) neighborhood of the tip is composed of a section of solid glass fiber that has obliquely sloping (truncated conical) sidewalls, whereby the sidewalls do not form a cylinder of any kind. Therefore, as the probe device laterally scans a rough surface, the calculations required to determine the desired information on the actual contours (actual profile) of the surface of the sample body require prior detailed knowledge of the slanting contours of the sidewalls of the probe, and these calculations typically do not yield accurate metrological determinations of the desired profile of the contours of the surface of the sample body, especially at locations of the surface of the sample body where sudden jumps (vertical jumps) thereof are located. In addition, fabrication of the probe device is complex and expensive, especially because of the need for drilling the aperture coaxially with the fiber.

Another example involves the fabrication of nanometric tip diameter fiber probes for photon tunneling microscopes ("PSTM") by selective chemical etching of the $GeO_2$-doped cores of optical fibers. See "Reproducible Fabrication Technique of Nanometric Tip Diameter Fiber Probe for Photon Scanning Tunneling Microscope", Togar Pangaribuan, et al., *Japan Journal Applied Physics*, Vol. 31 (1992), pp. L 1302–L 1304. By selectively etching the $GeO_2$ doped regions of the fiber, a tapered tip having the shape of a small cone can be formed on the endface of the optical fiber. The cone angle of the fiber probe tip is controlled by varying the doping ratio of the fiber core and the composition of the etching solution. A fiber probe with a cone angle of 20° and tip diameter of less than 10 nm was fabricated. Only probes having conical-shaped endfaces can be made with this technique, so that the sidewalls do not form a cylinder of any kind. The scanning range of such a probe is undesirably limited owing to the relatively large width (diameter) of the endface on which the relatively short-width conical tip is centered, coupled with the fact that, during scanning, the probe is rastered from side-to-side in an arc: a desired large length of scan is attempted, the corners of the probe's endface undesirably will make contact with the sample surface. In addition, the conical shape of the tip undesirably limits the accuracy of measurements wherever the surface being probed has a sudden jump.

SUMMARY OF THE INVENTION

This invention involves, in a specific device embodiment, a method of making of probe device, that can be used, for example, as an STM, AFM, or NSOM device, comprising the steps of (a) providing a cylindrical fiber segment;

(b) etching, prior to step (c), only a cylindrical bottom region of the fiber segment, the bottom region having an initial height, whereby its maximum width is reduced;

(c) cleaving the bottom region whereby its initial height is reduced to a reduced height and a cleaved bottom endface thereof is produced;

(d) coating both the cleaved endface and a predetermined height of the sidewalls that is equal to or less than its reduced height with a protective masking layer;

(e) etching the bottom region whereby the sidewalls thereof become concave;

(f) removing, prior to step (g), the masking layer; and (g) etching the bottom region whereby the maximum width of the cleaved endface is reduced to a desired value.

The lower cylindrical portion advantageously has a maximum width in the approximate range of 0.05 μm to 100 μm and terminating at its bottom extremity in an essentially planar end surface oriented perpendicular to the axis of the thin right cylindrical portion. As used herein, the term "maximum width" refers to the maximum diameter—i.e., the length of the longest line segment that can be drawn in a cross section of a cylindrical region of a fiber segment, the line segment being oriented perpendicular to the axis of the cylinder, from one extremity of the cross section to another. Advantageously, the etching in step (e) is essentially isotropic, as are the etchings in steps (b) and (g).

In the case of a circular cylindrical region, the width (=diameter) of each cross section in any direction is thus equal to this maximum width.

The term "essentially isotropic" refers to the situation in which the rates of etching in all directions do not vary from one another by more than approximately 10 percent.

The invention also involves a method of making such a probe device.

The fact that the lower portion of the probe device, thus terminates in at least approximately a planar end surface (endface)—advantageously oriented perpendicular to the axis of the cylinder—enables accurate positioning and hence position-determinations of the probe at locations of a surface of a sample body being scanned by the probe, even at sudden jumps in the surface. The resulting concave shape of the sidewalls of the lower region allow imaging of re-entrant (undercut) profiles on the surface of the sample body. The probe sidewalls can be coated with a suitable optically reflecting layer for confinement of the light inside the fiber probe tip if and when the probe is used for NSOM purposes.

DETAILED DESCRIPTION

Figure 1:
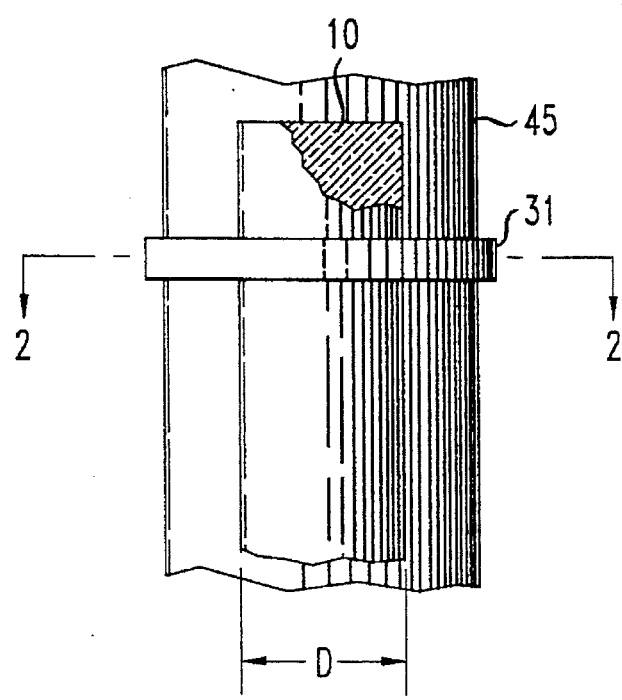
FIG. 1 is a cross-sectional elevational diagram of a standard fiber segment.
Figure 2:
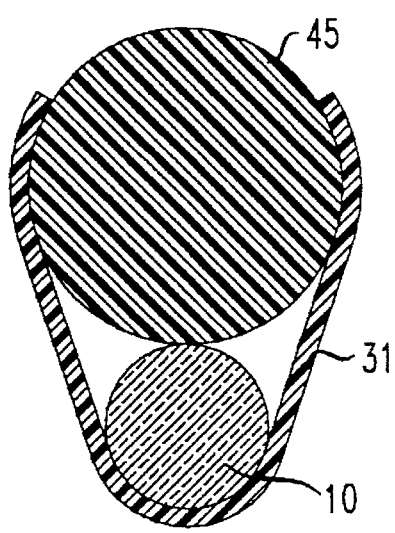
FIG. 2 is a horizontal cross-sectional diagram of the fiber segment shown in FIG. 1.

Referring to FIGS. 1 and 2, a fiber segment 10, typically an optical fiber segment, typically takes the from of a solid circular cylinder and is made of glass. The segment 10 is bonded to a holder 45, typically made of teflon, by a thin layer of suitable material 31 coated with an adhesive. A bottom portion of the fiber segment 10 is immersed (FIG. 3) in a wet essentially isotropic etching solution 50, typically a buffered oxide etching solution—such as a solution composed of 2 parts (7:1) buffered oxide etch, 1 part hydrofluoric acid, 1 part acetic acid, and 1 part $H_2O$. The acetic and $H_2O$ components help dissolve the accumulation of unwanted residual material on the fiber surface during etching.

Figure 4:
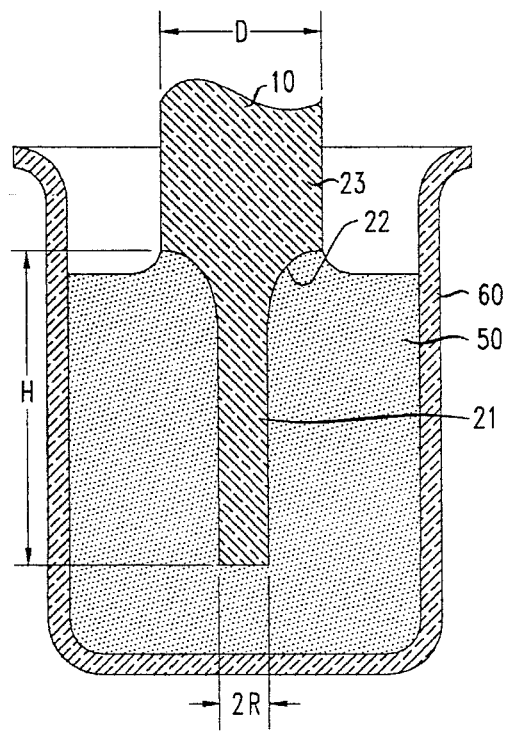

After the fiber segment 10 has thus been immersed in the etching solution 50 for a predetermined amount of time, it assumes the shape shown in FIG. 4—that is, relatively a thick cylindrical upper region 23, in the form of a solid circular cylinder, terminating in a tapered intermediate region 22, terminating in a relatively thin cylindrical lower region 21, in the form of another solid circular cylinder having in diameter 2R.

For example, the initial height (length) H (FIG. 3) of the bottom portion of the fiber segment 10, which is submerged in the etching solution 50, is typically equal to approximately 2.5 cm; and the diameter D (FIG. 1) of the fiber segment 10 is typically equal to approximately 125 μm or more. The segment 10 can have a core region (not shown) surrounded by a cladding region (not shown) as known in the optical fiber art.

After having been etched with the solution 50, the thin lower region 21 has a diameter 2R (FIG. 4) typically equal to approximately 30 μm or more, as determined by the time duration of the immersion.

Next, the bottom face of this lower portion 21 is cleaved, advantageously, in a plane oriented perpendicular to the (common) axes of the upper region 23 and the lower region 21, as by means ota fiber cleaver aided by optical microscopic viewing or other micrometer controlled procedure. In this way, the height of the lower cylindrical region 31 is reduced to a predetermined value h (FIG. 5), and the tip thereof is a plantr surface oriented perpendicular to the axis of this lower cylindrical region 31. Typically, this height _h is equal to approximately 5.0 μm. A useful approximate range of h is 0.05 μm to 50 μm; a typical range is 0.05 μm to 30 μm; and an advantageous approximate range is 0.5 μm to 10 μm.

After cleaving, a bottom portion of fiber region 31 (FIG. 5) is coated to a height k: with an etch-resistant protective masking layer 25. Advantageously this height k. is in the approximate range of h2 to h. ()tie way of forming the masking layer 25 is simply dipping the lower region of the fiber segment, to the height k, into a liquid polymer, such as the chlorofluorocarbon polymer resin KEL-F Brand 800 Resin (polymerized vinylidene fluoride and chlorotrilluoroethylene) as supplied by 3M Corporation, dissolved in amyl acetate or any other suitable solvent to the extent of 30 to 50 weight-percent polymer resin.

More generally the masking layer 25 can be a chlorofluorocarbon polymer resin dissolved in an organic solvent typically comprising a ketone or an ester or a mixture of them.

Next, the fiber is immersed (FIG. 7) into an etching solution 50, typically the same solution as described above in connection with FIG. 3. This etching is allowed to continue for an amount of time as determined for example, in advance by trial and error, or in situ by telescopic monitoring by the amount of desired degree of concavity of the side-walls of the resulting lower concave region 26 (FIG. 8). The concave shaped probe sidewalls are thus formed by the etchant-undercutting of the masking layer 25, and therefore the amount of undercutting (and hence degree of concavity) is determined by the amount of etching time of the etching (FIG. 7).

The masking layer 25 is then removed (FIG. 8) by a known method, typically by stripping it with a suitable solvent that does not attack the fiber. The etching indicated in FIG. 7 typically produces a cylindrical intermediate region 32, unless the level of the intersection of the meniscus of the etching solution with the fiber coincides with or falls below the level of the top of the tapered intermediate region 22 (which is not necessary and which would require a unnecessarily careful level adjustment).

Figure 8:
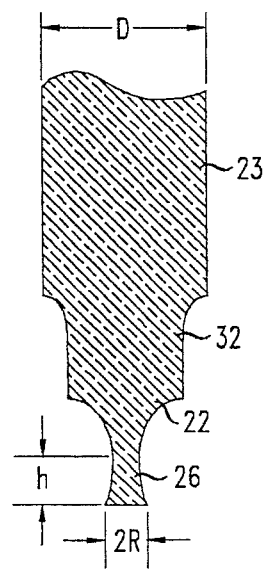
Figure 9:
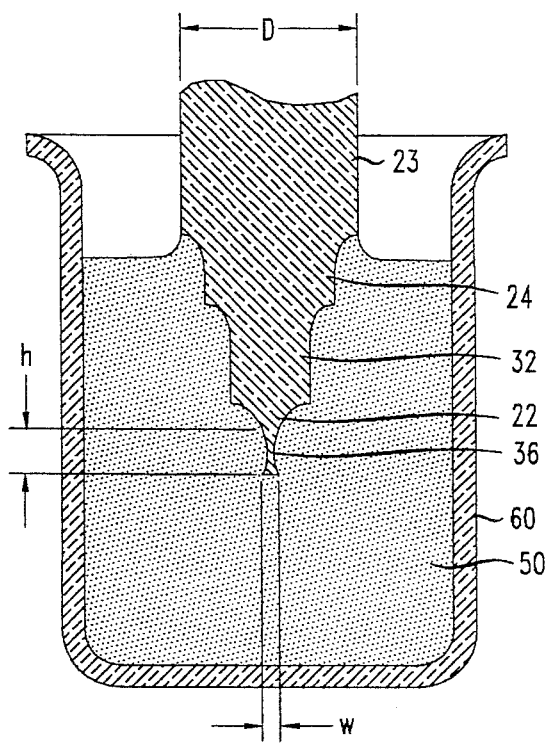

After removal of the masking layer (FIG. 8), the fiber is then essentially isotropically etched again (FIG. 9) until the final predetermined desired diameter w and height h (the latter being essentially the same as in FIG. 8) of the probe device are attained (FIG. 9). The fiber probe tip region 36 maintains its shape throughout the entire etching indicated in FIG. 9.

Figure 3:
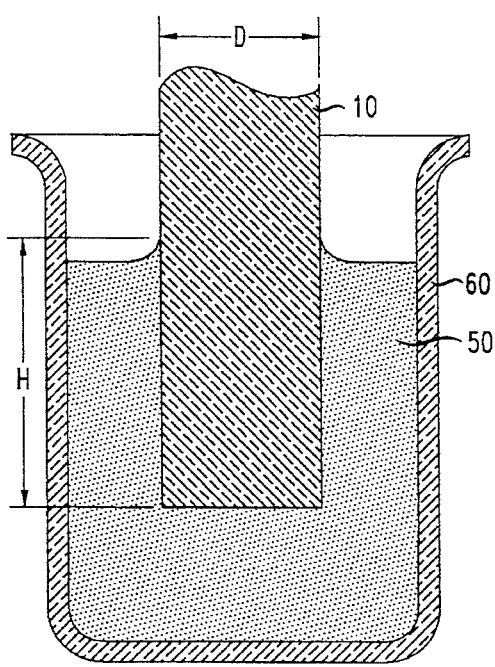
FIGS. 3–9 are cross-sectional elevational diagrams of a fiber probe device as it is being made in accordance with a specific embodiment of the invention. Only for the sake of clarity, none of the FIGURES is drawn to any scale.
Figure 7:
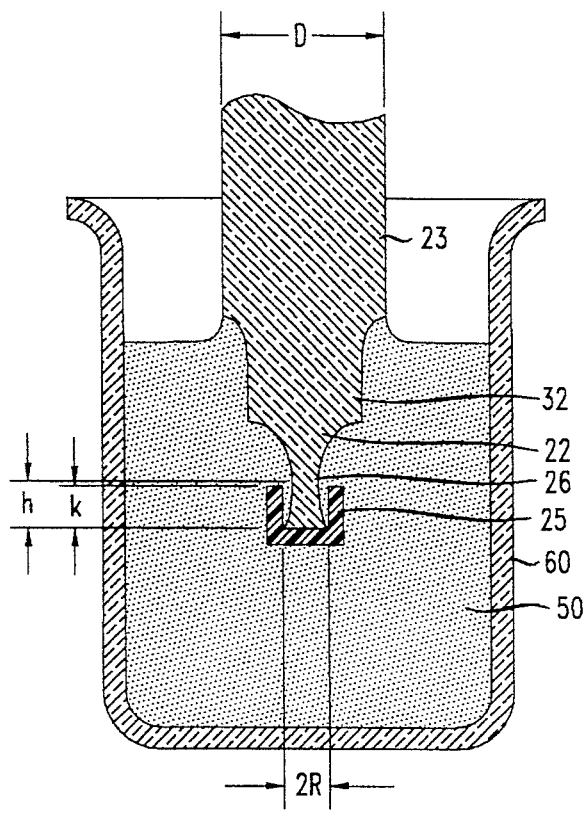

After the etching indicated in FIG. 7, the fiber segment (FIGS. 7 and 8) typically has a cylindrical intermediate region 32 depending on the height of submersion in the solution 50. The etching solution 50 indicated in FIGS. 7 and 9 typically have the same compositions as the etching solution 50 that was used earlier (FIG. 3). The etchings indicated in FIGS. 3–4, 7, and 9 are advantageously all essentially isotropic. Thus, essentially isotropic dry etching with a plasma could be used for any of these etchings, at some sacrifice in processing speed (at least in the present state of the dry etching art).

In this way, another cylindrical intermediate region 24 typically is formed again depending on the height of the submersion. Again, the formation of this cylindrical intermediate region 24 can be avoided by carefully adjusting the level of the intersection of the meniscus 52 the etching solution 50 with the fiber. At any rate, a very thin concave tip region 36 (FIG. 9) is formed having an endface of width w.

The tip region 36 thus has a predetermined bottom endface width w, which can be controlled by predetermining the etching time duration in the solution 50 (FIG. 9) as by trial and error, or by telescopic viewing during etching. The diameter w of the bottom endface of the tip region 36 can be as small as approximately 0.01 µm and as large as 150 µm or more—typically in the approximate range of 0.05 µm to 0.5 µm, and advantageously in the approximate range of 0.05 µm to 0.2 µm—depending on the ultimately desired metrological use of the probe when measuring sample surface, i.e., depending on the desired metrological resolution of the measurements to be made by the fiber during its subsequent use as a probe device.

Typically, such metrological use involves scanning (moving the tip region of the probe device across) a surface of a sample body with the probe while holding the probe device with an electromechanical feedback servo-mechanism, as known in the art, all of which distances are characterized by (for example) mutually equal components of force (for the case of NSOM) in the direction perpendicular to the overall surface of the sample body.

The time durations for all the etchings can be determined by trial and error or by telescope viewing in situ.

Although the invention has been described in detail in terms of a specific embodiment, various modifications can be made without departing from the scope of the invention. For example, instead of an optical fiber, the fiber segment 10 can be made of any material that can be etched as described above and that can be cleaved to form a (planar) tip. Any or all of the wet etchings can be enhanced by ultrasonic agitation. Instead of essentially isotropic wet etching, other kinds of etching techniques can be used, such as dry plasma etching. The etchings, especially those indicated in FIGS. 7 and 9, are advantageously (but not necessarily) essentially isotropic. The etching solutions (FIGS. 3–4, 7, and 9) can be chemically different or physically different (i.e., can be dry etching in any of these etching steps and wet etching in the others).

Figure 5:
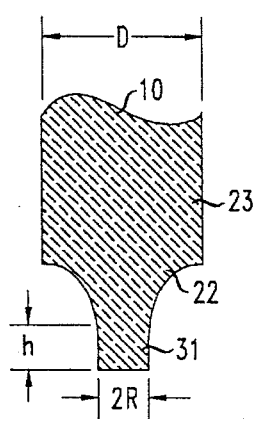
Figure 6:
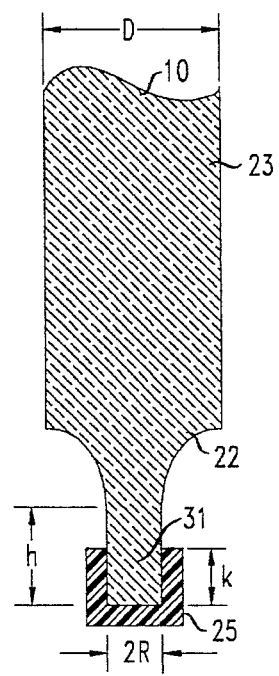

Another ("extra") cylindrical intermediate region (not shown) can be introduced between the cylindrical intermediate region 32 and the cylindrical upper region 23 by introducing another etching prior to cleaving (FIG. 5). The width W of this extra cylindrical region (not shown) is typically in the approximate range of 10 µm to 50 µm, and advantageously in the approximate range of 10 µm to 30 µm. More specifically, after the fiber segment 10 has been etched as indicated in FIG. 4, it is lifted up by a predetermined distance d and etched in situ for another predetermined time interval, as more fully described in copending patent application Marchman-3, Ser. No. 08/173,285 filed Dec. 22, 1993, now U.S. Pat. No. 5,394,500. Typically this distance d is in the approximate range of 5 µm to $2\times10^3$ µm (=2E3 µm), advantageously $5\times10^1$ µm (=5E1 µm) to $5\times10^2$ µm (=5E 2 µm). In such a case, the height h of the lower region 31 (FIG. 5) is typically in the approximate range of 0.05 µm to 30 µm, advantageously 1 µm to 10 µm.

For use as an NSOM device, the sidewalls of at least the tip region 36 advantageously are coated with an optically reflecting layer such as a metallic layer like chromium, or the fiber segment 10 has a core region and a cladding region as known in the art (whereby the cladding region reflects optical radiation during the NSOM use), or both.

In case the fiber segment 10 (FIG. 1) has a cladding region as well as a core region, advantageously the diameter of the core region (in which the chemical composition is uniform) is larger than w by an amount in the approximate range of 2.5- to 3.5 µm.

We claim:

1. A method of making a fiber probe device including the steps of:
    (a) providing a cylindrical fiber segment;
    (b) etching, prior to step (c), only a cylindrical bottom region of the fiber segment, the bottom region having an initial height, whereby its maximum width is reduced;
    (c) cleaving the bottom region whereby its initial height is reduced to a reduced height and a cleaved bottom endface thereof is produced;
    (d) coating both the cleaved endface and a first height of the sidewalls that is equal to or less than its reduced height with a protective masking layer;
    (e) etching the bottom region whereby the sidewalls thereof become concave;
    (f) removing, prior to step (g), the masking layer; and
    (g) etching the bottom region whereby the maximum width of the cleaved endface is reduced to a desired value.

2. The method of claim 1 in which the desired value is in the approximate range of 0.01 µm to 150 µm.

3. The method of claim 2 in which the approximate range is 0.05 µm to 0.5 µm.

4. The method of claim 2 in which the approximate range is 0.05 µm to 0.2 µm.

5. The method of claim 3 in which the cleaving is oriented in a plane perpendicular to the axis of the bottom cylindrical region.

6. The method of claim 1 in which the ratio of the first height to the reduced height is in the approximate range of 0.5 to 1.

7. The method of claim 1 in which the etching of step (e) in claim 1 is essentially isotropic.

8. The method of claim 7 in which the etching of step (g) is essentially isotropic.

9. The method of claim 1 in which the cleaving is oriented in a plane perpendicular to the axis of the bottom cylindrical region.

10. The method of claim 1 in which the reduced height is in the approximate range of 0.05 µm to 30 µm.

11. The method of claim 9 in which the ratio of the first height to the reduced height is in the approximate range of 0.5 to 1.

12. The method of claim 1 in which the reduced height is in the approximate range of 0.5 µm to 10 µm.

13. The method of claim 11 in which the ratio of the first height to the reduced height is in the approximate range of 0.5 to 1.

14. The method of claim 1 further comprising, between steps (b) and (c), the step of further etching a lowest portion of the bottom region, whereby the maximum width of the lowest portion is less than that of the bottom region.

15. The method of probing a surface of a sample body including making the fiber probe device in accordance with claim 14 followed by moving the fiber probe device across the surface of the sample body.

16. The method of claim 15 in which the protective layer is formed by dissolving a chlorofluorocarbon polymer resin in an organic solvent.

17. The method of claim 15 in which the protective layer is formed by dissolving a chlorofluorocarbon polymer resin in a ketone or an ester or a mixture of a ketone and an ester.

18. The method of claim 14 in which the fiber segment is essentially glass and in which the protective masking layer is formed by dissolving a chlorofluorocarbon polymer resin in an organic solvent.

19. The method of claim 14 in which the fiber segment is essentially glass and in which the protective masking layer is formed by dissolving a chlorofluorocarbon polymer resin in a ketone or an ester or a mixture of a ketone and an ester.

20. The method of claim 1 in which the protective masking layer is formed by dissolving a chlorofluorocarbon polymer resin in an organic solvent.

21. The method of claim 1 in which the protective masking layer is formed by dissolving a chlorofluorocarbon polymer resin in a ketone or an ester or a mixture of a ketone and an ester.

22. The method of claim 1 in which the fiber segment is essentially glass and in which the protective masking layer is formed by dissolving a chlorofluorocarbon polymer resin in an organic solvent.

23. The method of claim 1 in which the fiber segment is essentially glass and in which the protective layer is formed by dissolving a chlorofluorocarbon polymer resin in a ketone or an ester or a mixture of a ketone and an ester.

24. The method of probing a surface of a sample body including making the fiber probe device in accordance with claim 1, 2, 3, 4, 5, 6, 7, 8, 9, 10, 11, 12, 13, 20, 21, 22, or 23 followed by moving the fiber probe device across the surface of the sample body.

* * * * *